J. S. ENGLE.

PUMP-PLUNGER.

No. 6,992. Reissued March 14, 1876.

WITNESSES

Mary J. Utley.

George H. Lanier

INVENTOR.

Jacob S. Engle.

Gilmore & Co.

ATTORNEYS.

THE NORRIS PETERS CO., PHOTO-LITHO., WASHINGTON, D. C.

UNITED STATES PATENT OFFICE.

JACOB S. ENGLE, OF PALMYRA, PENNSYLVANIA.

IMPROVEMENT IN PUMP-PLUNGERS.

Specification forming part of Letters Patent No. 169,974, dated November 16, 1875; reissue No. 6,992, dated March 14, 1876; application filed February 12, 1876.

*To all whom it may concern:*

Be it known that I, JACOB S. ENGLE, of Palmyra, in the county of Lebanon and State of Pennsylvania, have invented a new and valuable Improvement in Pump-Plungers; and I do hereby declare that the following is a full, clear, and exact description of the construction and operation of the same, reference being had to the annexed drawings making a part of this specification, and to the letters and figures of reference marked thereon.

Figure 1:
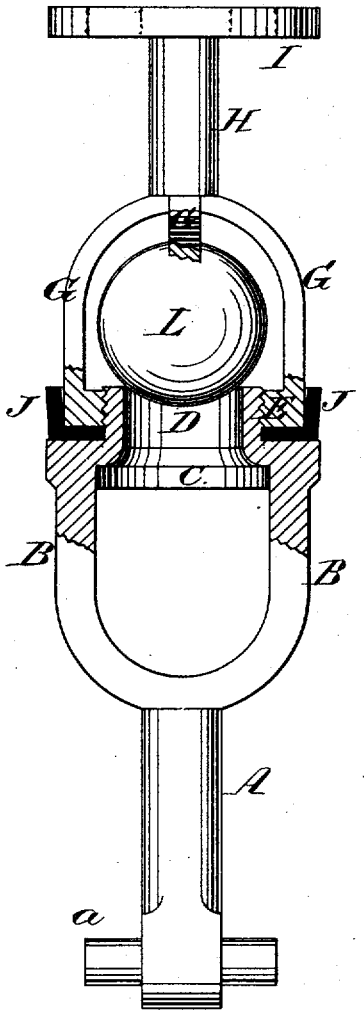
Figure 2:
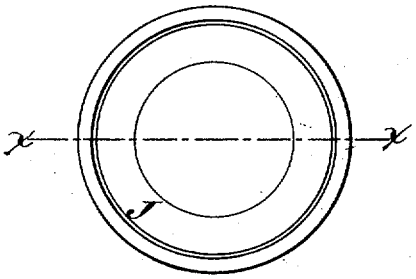
Figure 3:
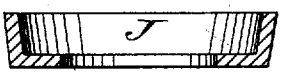

Figure 1 of the drawing is a representation of a side view, part sectional, of my pump-plunger; Fig. 2 is a plan view of the packing thereof, and Fig. 3 is a sectional view of the same.

My invention relates to force-pumps; and it consists in the construction and novel arrangement of the pump-plunger, with a ball-valve and a cup-shaped leather packing secured in position by screwing the two parts of the plunger together, and a guide-head above the valve, as will be hereinafter explained.

In the annexed drawings, the lower part of the plunger is shown formed of a stem, A, with a cross-pin, *a*, at its lower end, and the upper end formed with two curved arms, B B, which connect it to a ring, C, beveled on the inner edge, as shown. From the inner edge of the ring C on the upper side projects a collar, D, provided with screw-threads on its exterior side. This part of the plunger is preferably cast in one piece. The upper part of the plunger is likewise cast in one piece; and consists of a ring, E, having interior screw-threads, and from its upper side curved arms G G, four in number, connect it to a stem, H, which has a circular head, I, on its upper end. J represents a ring of leather to form the packing of the plunger, which ring fits around the screw-collar D, after which the two parts of the plunger are screwed together tightly, holding the packing ring firmly in its place. This ring extends beyond the sides of the plunger, and is turned upward around the ring E, as shown, making a cup-shaped packing; or, if desired, the packing may be shaped by suitable formers into the desired shape before being placed on and fastened in the plunger. L represents a ball-valve made of india-rubber, or other suitable material, and placed inside of the cage formed by the arms G, so as to play upon a valve-seat at the upper end of the collar D. When the plunger is depressed the valve L will rise and allow water to pass above it, and through the guide-head I, and when the plunger is raised valve L will shut down upon its seat and lift the water.

This plunger is cheap in construction, durable, and not liable to get out of order, and the packing being cup-shaped will effectually prevent any water from getting between the plunger and pump-cylinder.

What I claim as new, and desire to secure by Letters Patent, is—

The combination of the ring C with arms B, stem A, and screw-collar D, the ring E, with female screw-threads, arms G, stem H, and guide-head I, the cup-shaped packing J, and ball-valve L, all substantially as set forth.

In testimony that I claim the above I have hereunto subscribed my name in the presence of two witnesses.

JACOB S. ENGLE.

Attest:
BASSLER BOYER,
LEWIS REHR.